United States Patent [19]

Stern

[11] Patent Number: 4,645,629

[45] Date of Patent: Feb. 24, 1987

[54] METHOD OF MANUFACTURING HEAT MOLDING GARMENTS

[76] Inventor: Brett Stern, 111 W. 28th St., New York, N.Y. 10001

[21] Appl. No.: 745,011

[22] Filed: Jun. 14, 1985

[51] Int. Cl.$^4$ .............................................. B06B 3/00
[52] U.S. Cl. ........................................ 264/23; 2/169;
  156/73.3; 156/228; 156/245; 156/251; 264/25;
  264/153; 264/163; 264/248; 425/174.2
[58] Field of Search ................... 264/248, 23, 25, 292,
  264/231, 324, 153, 163; 425/174.2; 156/73.1,
  73.3, 245, 251, 228, 292, 272.2; 128/463, 504,
  506; 2/169, D7

[56] References Cited

U.S. PATENT DOCUMENTS

| | | | |
|---|---|---|---|
| 3,657,033 | 4/1972 | Sager | 156/73.3 |
| 4,034,853 | 7/1977 | Smith | 2/169 X |
| 4,392,257 | 7/1983 | Furga | 156/251 |
| 4,459,704 | 7/1984 | Sears et al. | 264/292 |

Primary Examiner—Jan Silbaugh
Assistant Examiner—Harold Pyon
Attorney, Agent, or Firm—Helfgott & Karas

[57] ABSTRACT

A method and apparatus for manufacturing a garment which is three dimensionally molded. The garment in the form of opposing sheets of fabric are fed from bolts of fabric to a molding station wherein a male mold section is provided in the shape of the three dimensional garment desired. A pair of opposing female mold sections close onto the male mold section sandwiching the sheets of fabric into the mold cavities. Heat is applied to mold the fabric sheets into the three dimensional garment. Simultaneously, an ultrasonic seamer cuts and bonds the periphery of the material around the mold. The mold cavity is then opened, portions of the mold are separated and the garment is then lifted off the male mold section.

11 Claims, 12 Drawing Figures

METHOD OF MANUFACTURING HEAT MOLDING GARMENTS

BACKGROUND OF THE INVENTION

This invention relates to heat molded garments, as well as to a method and apparatus for the manufacture of such garments, using the combination of heat molding techniques and ultra sound bonding techniques.

Historically, the garment manufacturing industry has utilized well known cut-and-sew procedures in the manufacture and production of garments. Typically, a pattern is created and fabric material is cut in accordance with the garment pattern. The various sections cut are then sewn together to form the particular garment.

Clothing production is an extremely labor intensive process. There are approximately forty separate steps involved in the manufacture of a single garment, such as a dress. Although there has been a significant modernization of the individual steps involved in garment manufacture, it still remains basically the same cut-and-sew operation that has been in existence for over a hundred years. Even with the introduction of newly developed laser cutting and automatic sewing machines, the manufacture of the garment still requires much hand manipulation of the fabric. Not only does this make the process highly labor intensive, but also causes many quality control problems because of the impossibility of achieving precise replication of manual manipulations.

An additional problem with the existing cutting and sewing techniques is that the resulting garment is one that is substantially two dimensional. Beginning from a pattern and cutting designs and sections and ultimately piecing them together results only in a flat garment having front and back portions. Since the garment is to be worn by a three dimensional human form, numerous techniques have been introduced to permit the two dimensional fabric to achieve a proper shape on the human form. Darts, ruffles, pleats, and similar gathering of material is formed at various portions of the fabric design in order to simulate a three dimensional form.

Nevertheless, because of the standard techniques, great imposition is placed upon designers who must restrict their capabilities to two dimensional patterns. In addition, the garments themselves frequently do not lie properly on the human form and unsightly bulges appear, or sections may stretch greater than their capabilities.

In order to permit actual three dimensional formation of garments, various techniques have been introduced in the past. For example, after the introduction of knitted fabics, the inclusion of additional stitches in the fabric design permitted a three dimensional shape in such knitted garments. Utilizing complex knitting machines, such additional stitching could be achieved. However, this approach was limited to knitted fabrics and also required extremely complicated design and control of the knitting machines.

A more recent development is the ability to actually mold garments into three dimensional form. Although garment molding machines were introduced in the early 1900's, they were not utilized to great extents until the invention of appropriate fabrics which accommodate thermo-setting techniques. The introduction of man made fibers and synthetic thermoplastic continuous yarn such as nylon or polyesters, gave greater feasibility to the molding of garments. However the capabilities were little utilized in garment production. The use of such molding techniques has generally been limited to the formation of specialized items such as brassieres and bra cups for swimwear, and the like. By way of example, U.S. Pat. No. 3,077,196 was one of the first to introduce a one piece molded plastic brassiere fitted with a non molded elastic band on the back. Likewise, "seamless" garments were also introduced utilizing molding techniques. In fact, in many cases the "seamless" bra has become the common terminology of molded brassiere cups.

Little, however, was done to utilize the molding technique for overgarments such as dresses, shirts, and the like. Nevertheless, U.S. Pat. No. 3,819,638 did introduce a method of making molded ladies dresses from knitted fabrics. That patent, however, utilized a cylindrical fabric and stretched the fabric in its cylindrical form over a mold in order to make an appropriate tubular dress. Sleeves, and other portions were molded in tubular fashion and sewn onto the main body portion.

While certain of these molding techniques have been known and developed, they have been essentially limited to experimental use mainly because the techniques introduced failed to lend themselves to automated continuous formation of garments. Additionally, they failed to provide for the ability of simulating the production of the garment with that of standard cut and sew techniques. As a result, thus far the garment industry still depends upon the standard cut and sew methods and the use of molded garment techniques have failed to achieve inroads in the garment industry.

SUMMARY OF THE INVENTION

It is accordingly an object of the present invention to provide a method of manufacturing a garment which avoids the aforementioned problems of prior art devices.

Another object of the present invention is to provide a method of manufacturing a garment utilizing heat molding techniques which can be applied to an automated sequence of operations.

Yet a further object of the present invention is to provide a method of manufacturing a garment utilizing the combination of heat molding techniques and ultrasonic bonding techniques.

An additonal object of the present invention is to provide a method of manufacturing a garment utilizing an automated process involving heat molding of the garment and simultaneous ultrasound bonding of the seams of the garment being molded.

Another object of the present invention is to provide an apparatus or the automated manufacturing of garments using heat molding and ultrasonic bonding techniques.

Yet a further object of the present invention is to provide a garment having a three dimensional form produced by heat molding and including ultrasonically bonded seams.

Yet a further object of the present invention is to provide molds for use in connection with automated processes for forming garments through heat molding techniques.

Briefly, the present invention provides for a method of manufacturing garments which lends itself to automated processes. The method includes feeding opposing sections of fabric material along a conveyer system leading to a molding section. The molding section includes a male mold conforming to the particular three dimensional body configuration of the garment to be molded. For example, it can conform to the upper torso portion when molding a shirt, blouse, or the like. There are also provided an opposing pair of female mating mold sections for closing onto the male mold and defining opposing mold cavities on either side of the male mold section. The opposing sections of fabric material are positioned on either side of the male mold within the mold cavity. The female mold sections are closed onto the male mold with heat applied, to thereby mold the garment into the shape desired. While the molding is taking place, an ultrasonic device carries out bonding and cutting whereby the garment is cut around the periphery of the mold an at the same time the opposing sections are bonded together. In this manner the garment is finished on the mold form. After suitable cooling, the mold cavity is opened and the garment is removed.

In removing the garment, the mold itself is formed with separable portions to faciltate the removal of the garment. For example, in the formation of a blouse, the arm sections of the mold can be removed or retracted with respect to the body portion of the mold to permit release of the garment. The garment is then lifted up by means of a robotic lifter.

The invention also contemplates apparatus for carrying out the above mentioned manufacture process. Also, the invention contemplates the mold required for utilization within such apparatus.

Also included within the invention is a garment itself molded into a three dimensional configuration including a three dimensional front portion and a three dimensional back portion with ultrasonically bonded seams joining the front and back portions.

The aforementioned objects, features and advantages of the invention will, in part, be pointed out with particularity and will, in part, become obvious from the following more detailed description of the invention, taken in conjunction with the accompanying drawings, which form an integral part thereof.

DESCRIPTION OF THE PREFERRED EMBODIMENT

Figure 1:
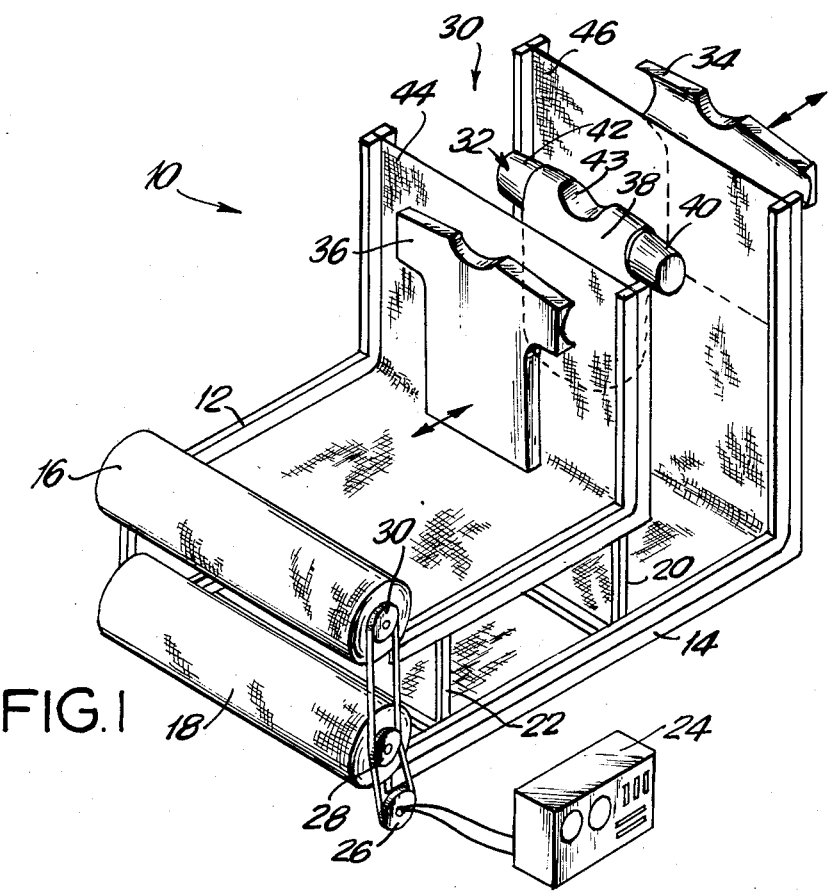
FIG. 1 is a schematic representation of the apparatus for manufacturing a three-dimensional garment, including the feeding of the fabric as opposing sections on either side of the male mold portion using a system controlled conveyer.

Referring now to FIG. 1, there is generally shown an apparatus 10 including an upper conveyer system 12 and a lower conveyer system 14. A bolt of fabric 16 is connected to the upper conveyer 12 and a second bolt of fabric 18 is connected to the lower conveyer 14. The conveyer system can typically include a pin frame which serves to fix and stabilize the fabric as it is fed along the conveyer system. The conveyers are shown spaced apart by means of separating supports 20, 22.

The conveyer is driven by means of a system controlled unit schematically shown at 24, electrically connected to the appropriate belt drive mechanism 26 coupling to the drive 28 associated with the bolt of fabric 18 and the drive 30 associated with the bolt of fabric 16. The system control 24 is appropriately arranged so that it simultaneously moves the upper and lower fabric material along their conveyers until the material is properly fed into the mold section. Appropriate synchronisation will be used to drive the fabric and the conveyer system in order to coordinate smooth flow. A motor drive will serve to unwind the fabric from the bolts and properly feed them onto the pin frames.

The mold serves, shown generally at 30, comprises a male mold 32 and spaced apart a pair of mating female molds 34, 36. The particular molds are of a form to make a shirt and therefore the male mold portion 32 is in the form of a upper torso including a body portion 38 with a pair of opposing arm portions 40, 42 laterally positioned thereof, and a cut out neck portion 43. The female mold portions likewise have corresponding sections to close onto the male mold portion. Together, a pair of opposing mold cavities are formed between each of the female mold sections and the male mold sections.

Figure 2:
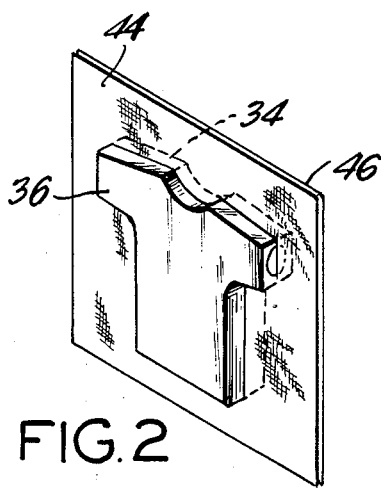
FIG. 2 is a schematic drawing showing a further step in the manufacture with the closing of the female mold portions onto the opposing sections of the fabric.

The conveyer belt feeds a first section of fabric material 44 between the female mold portion 36 and the male mold section 32, and a second opposing sheet of fabric material 46 between the female mold portion 34 and the male mold 32. As soon as the two sheets of fabric 44, 46 have been fed into the mold cavities, a suitable timer contained within the control system 24 will stop the conveyer. The mold, which is maintained at a predetermined temperature will then close for a preselected length of time. As shown in FIG. 2, the opposing sections of fabric 44, 46 are then heat molded within the mold cavities. The heater for the molding operation can be implanted within the mold itself or can be from an external source.

Figure 3:
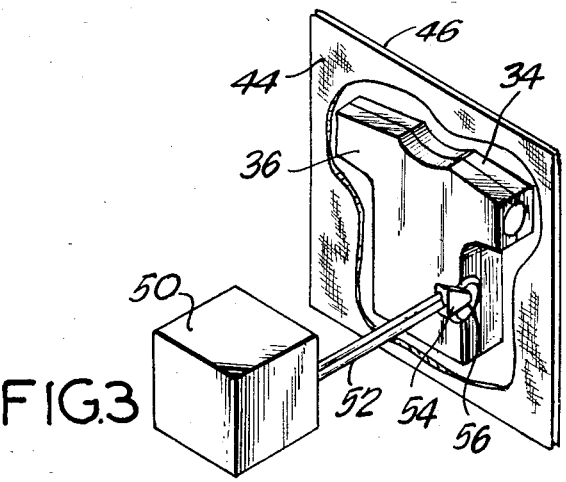
FIG. 3 is a schematic representation of the ultrasonic cutting and seaming of the edges of the opposing sheets of fabric while still in the mold.

Simultaneously with the molding operation, an ultrasonic seamer, shown at 50 in FIG. 3 will make a complete transverse around the perimeter of the mold in order to bond together the opposing sheets of fabric material 44, 46. At the same time, it will serve to cut away the surrounding fabric around the mold. The ultrasonic seamer is shown in include a robotic arm 52 with an appropriate cutting edge 54 which simultaneously serves to seal the sheet of fabric. An appropriate bond 56 will be formed between the front and back sheets of fabric.

Figure 4:
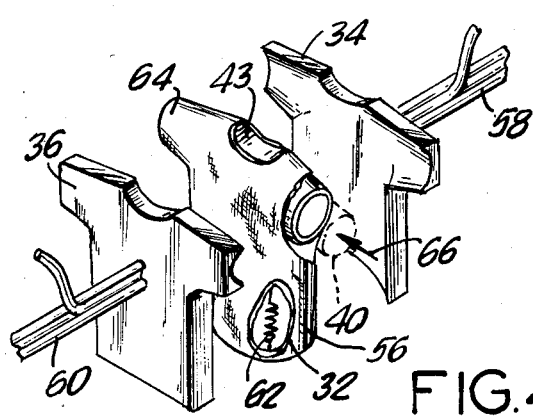
FIG. 4 shows a further step in the manufacturing process and specifically the opening of the mold cavity and the removing of a section of the mold.

As shown in FIG. 4, the mold will remain closed for a short interval of time after the heating operation in order to appropriately cool the garment. Cooling can also occur after the mold reopens with the garment remaining upon the mold, as shown in FIG. 4. The opening and closing of the mold can be achieved by means of a pneumatic device 58, 60 for retracting and compressing the mold sections. The appropriate tubes with compressed air would operate the pneumatic device. As is shown in FIG. 4, heating can take place by means of electrical heaters such as the resistance wire 62 embedded directly within the mold. However, it should also be appreciated, that other type of heating arrangements could also be used, wherein the heating can be in the female mold portions, or exteriorly. Appropriate temperature control sensing devices would be included. These can be implanted in the various portions of the mold such as the exterior portions thereof.

The garment 64 is shown as being completely formed onto the male mold with appropriate ultrasonically bonded seams. In order to remove the garment, the molds are made with separating portions. Specifically, as shown in FIG. 4, the arms 40 of the male dye are shown as being retractable internally of the body portion as shown by the arrow 66. Appropriate spring mechanisms, pneumatic control, etc., can be embedded within the mold itself in order to retract the projecting portions of the mold. Alternately, portions can be removable, as by a pneumatic arm.

Figure 5:
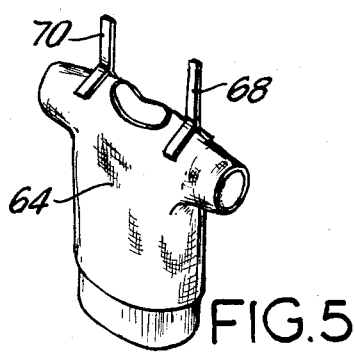
FIG. 5 shows yet another step in the manufacture including the removal of the completed garment from the male mold portion.

Once the garment is free from restriction, a suitable robotic lifter whose arms 68, 70 are shown in FIG. 5, can be used to pinch the fabric so as not to damage it. The fabric can then be lifted up from the mold as a finished garment and delivered to a secondary system for suitable labeling, packaging, etc.

As soon as the lifter has cleared the garment from the mold, the drive mechanism reactivates the conveyer belt and the entire cycle is completed.

The apparatus required to carry out the device can be a composite of various equipment much of which is readily available. For example, the ultrasonic seamer and cutter can be of the type available from BRANSON SONICS INC. The lifter can of a type manufactured by CLUETT who supply a line of "Clupicker" products. Other parts of the equipment, such as an adjustable electric clock mechanism to start and stop the drive motors, are also well known. The master control system itself can be an appropriate driving mechanism which starts and stop the conveyer belt.

The molds themselves can be contructed in various manners. By way of example, two half-body molds of the upper torso of a body portion can be constructed using standard garment industry dress forms. For example, separate negative casts of the front and back halves of the torso can be constructd from the dress form using hydrostone or other gypsum type of material. These negative hydrostone casts can then be used to construct two aluminum working molds for use in the processing system. The aluminum casting can then be provided with the electrical heating elements together with temperature sensor controllers and watt meters for measuring power consumption. The molds can be made with retracting or removable portions such as the arm portions, which will permit separation of these parts to facilitate removal of the garment.

Using cad-cam software techniques, the mold itself can also be constructed in accordance with the actual configuration of a wearer. A suitable "mouse" or other sensor can be used to plot the various three dimensional characteristics of the actual wearer using standard cadcam techniques. A computer can generate the appropriate dimensions for the manufacture of the mold. In this manner, each wearer can actually have a mold in accordance with his actual dimensions and garments can then be manufactured to fit each particular wearer where the garment itself is three dimensions in accordance with the actual dimensions of the wearer.

Figure 6:
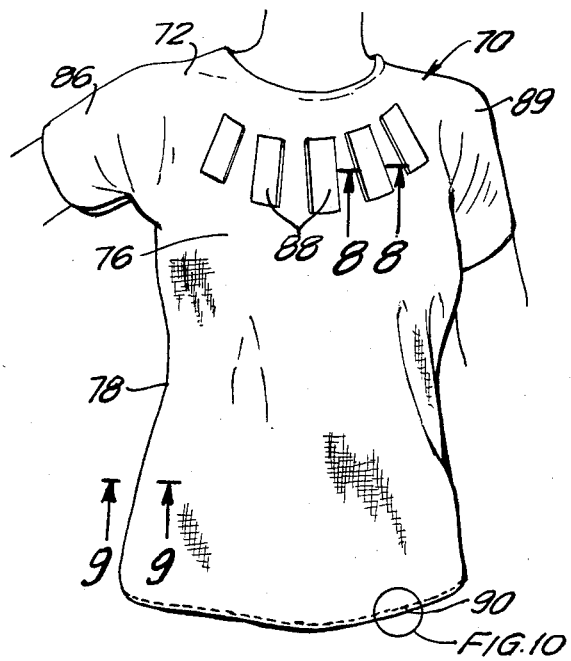
FIG. 6 is a front view of a molded garment manufactured in accordance with the steps previously described.
Figure 7:
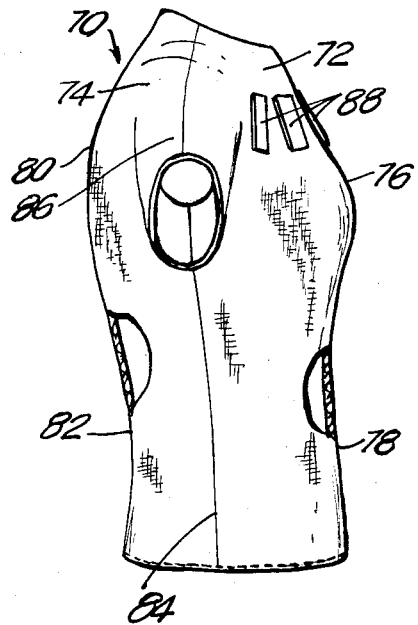
FIG. 7 is a side view of the garment shown in FIG. 6 and specifically showing the three dimensioned molding of both the front and rear fabric sections as well as the molding of the sleeve portion.

Referring now to FIGS. 6 and 7, an actual garment 70 has been constructed in accordance with the previously mentioned techniques. The garment itself is formed of a front fabric section 72 and a rear fabric section 74 and forms the shape of a t-shirt or blouse. It should be noted that the front section 72 is three dimensioned so as to actually include a projecting chest portion 76 and an indented waist portion 78. Similary, the back portion 74 is contoured to have a rounded back portion 80 and an indented waist portion 82. The front and back sections are interconnected along an ultrasonically boned seam 84.

As is noted, the sleeves 86, 88 are actually formed of front and rear sections integrally with the rest of the body portion. This is quite contrary to standard cut and sew techniques where the sleeve portions would be formed independently and sewn onto the body portion. Since the front and back sections are each molded from a respective single sheet each can actually include a half of a sleeve portion with the two sleeve halves being ultrasonically bonded together along the same seam line 84.

Figure 8:
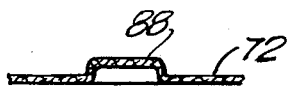
FIG. 8 is a cross sectional view taken along lines 8—8 of FIG. 6 and showing the molding of a three dimensional graphic design directly in the garment simultaneous with the formation of the garment.

In addition to molding the garment into a configuration to fit the wearer and have an appropriate shape of the body portion, three dimensional graphic designs can also be included. By way of example, the rectangular three dimensional projections 88 are molded directly into the upper front portion 72. As best shown in FIG. 8, these projections are actual three dimensional portions molded out of the fabric front sheet 72. Other type of graphics can also be molded into the design. In fact, appropriate creases, pleats, etc. can be molded into the design along with ruffles and other three dimensional forms.

Figure 9:
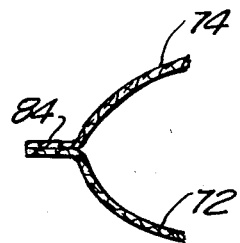
FIG. 9 is a cross sectional view taken along lines 9—9 of FIG. 6 and showing the ultrasonically bonded seams between the opposing front and rear sections of the garment.
Figure 10:
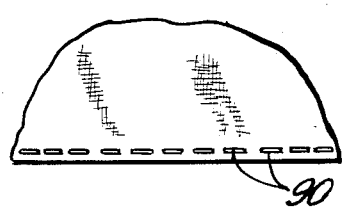
FIG. 10 is an exploded view of the lower edge of the garment and showing an ultrasonically bonded stitching arrangement simulating a sewn stitch.

The ultrasonic bond 84 which forms a seam between the front and rear fabric sheets 72, 74, is best shown in FIG. 9. However, as shown in FIG. 10, the ultrasonic bonding can provide an effect similar to that of stitiching. Specifically, the lower edging is shown to include a plurality of individual bonded intervals 90 spaced from each other in order to simulate a stitching. The use of simulated stitching permits the fabric to stretch. In addition to the ultrasonic bonding, the same operartion can also provide graphic designs by using ultrasonic bonds at various locations in order to produce the design itself.

The type of material which is best suited for such molding techniques is typically a thermosetting material, and especially materials including synthetic man made materials. Types of fabrics used for such molding techniques includes polyester, nylon, acrylic, any blends of these materials with natural fibers such as cotton and wool, as well as a variety of knit materials. However, almost all garments can have thermosetting properties depending upon the temperature, time and pressure involved.

Figure 11:
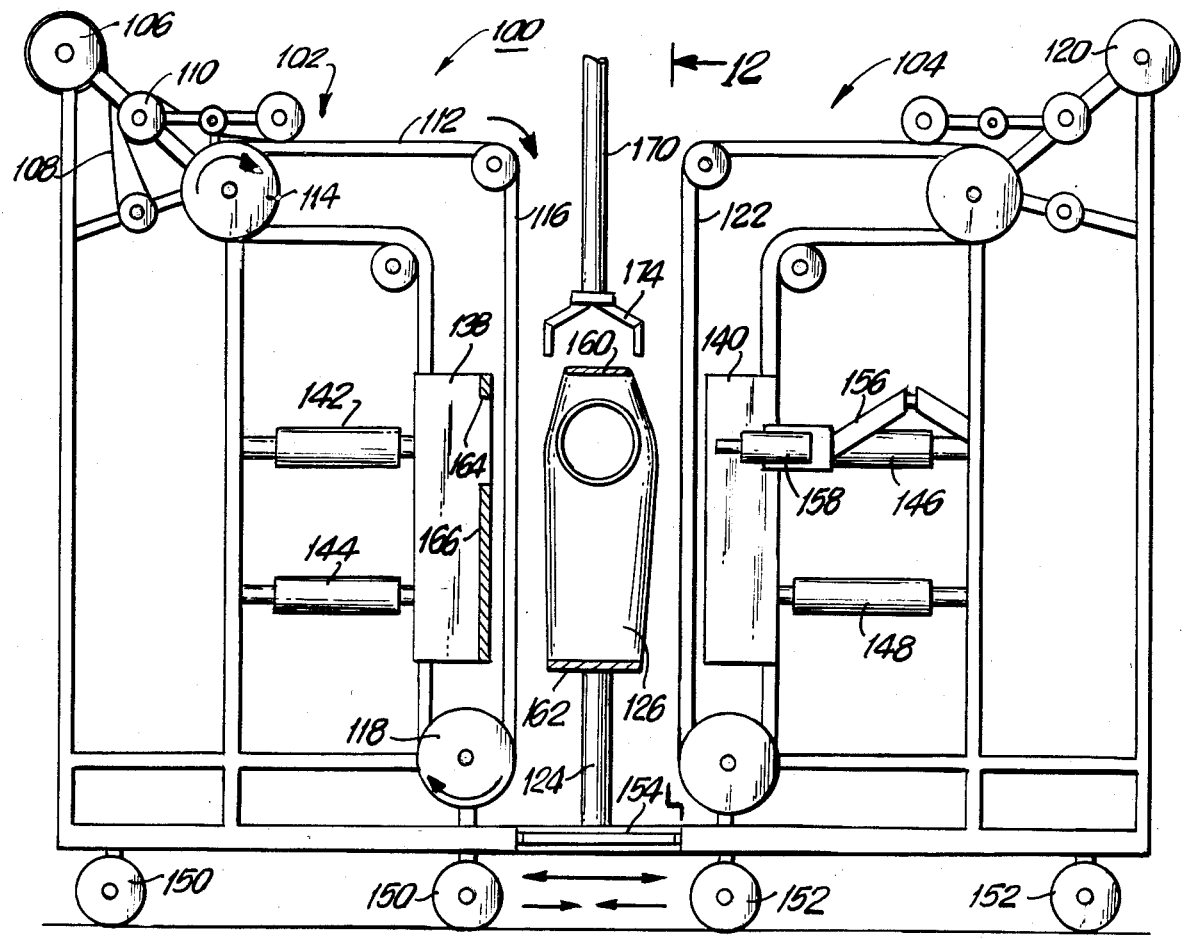
FIG. 11 is a detailed schematic view of an apparatus for forming the three dimensional garment of the present invention.
Figure 12:
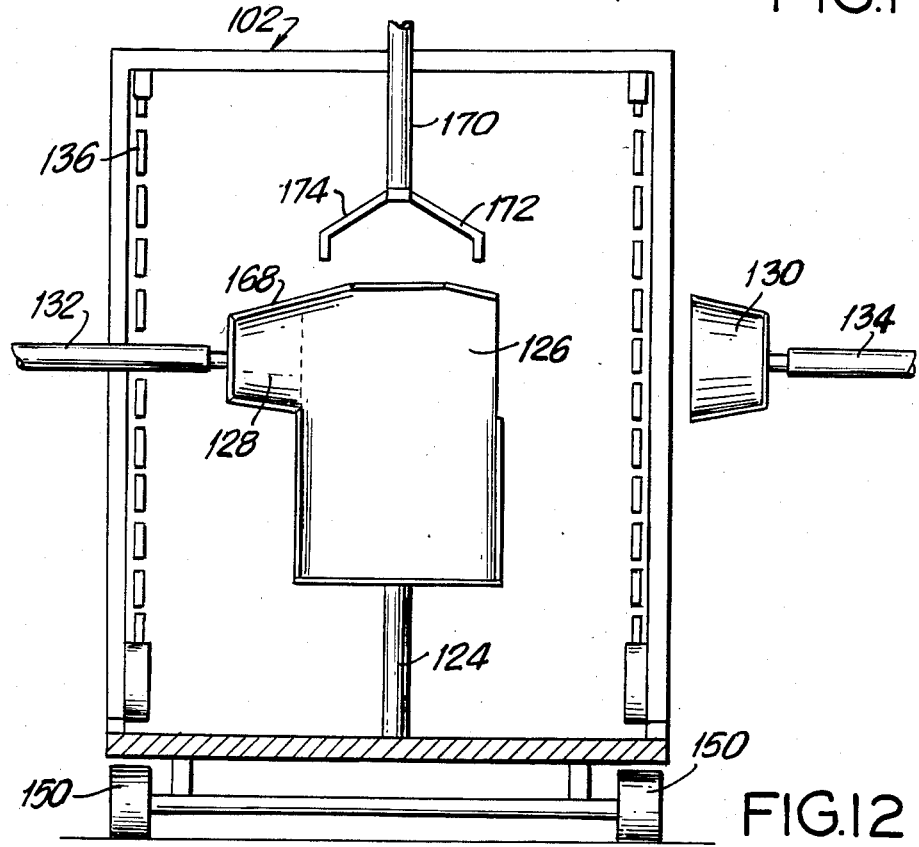
FIG. 12 is a side view looking in at 12—12 of FIG. 11, In the various figures of the drawings, like reference characters designate like parts.

Referring now to FIGS. 11 and 12, thre is shown a specific structure constituting an automated apparatus for manufacture of a garment in accordance with the present invention. The apparatus includes a tenter frame 100 having substantially similar left portions 102 and right portions 104. On the section 102, there is provided a bolt of fabric 106 which feeds the fabric 108 along a series of tensioning belts 110 from which the fabric extends onto the conveyer 112 driven by the drive wheel 114. The fabric passes downward along the vertical section of the belt 116 and is held in a taut position by means of the lower control wheel 118.

A similar arrangement occurs on the right side with another bolt of fabric 120 feeding the fabric along the vertical conveyer section 122.

Supported on a post 124 in between the two tenter frame sections 102, 104, is a male mold form 126 in the form of a body torso having a pair of opposing arm portions 128, 130. The arm portions are connected to pistons 132, 134 in order to remove the arm portions 128, 130 so as to permit lifting of the garment off the mold.

The tenter frame 102 and 104 includes side pin plates 136 to support the fabric on each side and maintain it in a taut condition on opposing sides of the male mold 126. Spaced behind each of the vertical fabric sections 116, 122 are respective female mold sections 138, 140 for mating with the male mold section 126. The female mold sections are supported by means of pistons 142, 144 and 146, 148 to move the female sections onto the mold section thereby closing the mold cavity. The left tenter frame 102 is supported on wheels 150 and likewise the right section is supported on wheels 152. By means of the telescoping arrangement along the rod 154, the two tenter frame sections can be respectively moved toward each other to open and close the tenter frame around the male mold 126.

In opearation, the fabric is fed respectively from the bolts 106, 120 to position them in the vertical sections 116, 122 on either side of the male mold 126. The left and right halves of the machine roll on the wheels to open and close the tenter frame around the positive mold. The piston arms 142–148 then move together to close the mold cavity and heat is applied to mold the fabric into the desired shape. A robotic arm 156 carrying an ultrasonic welder 158 would then be rotated around the mold cavity. Appropriate perforated anvil sections 160, 162, 164 and 166 would form the stitching arrangement around the periphery of the garment, the neck portion, the hems, and around the sides. A solid anvil portion 168, around the outer periphery of the garment would serve as the mating portion for the cutting of the garment.

After the garment has been molded and properly ultrasonically bonded and cut, the garment would be permitted to cool. The left and right halves would open and the pneumatic arms controlling the female mold sections would be retracted. The arm portions 128, 130 of the mold would be removed. A garment lifter 170 having a pair of opposing pinching arms 172, 174 would be lowered to grab the garment and lift it off the male mold section. the process would then again repeat for a next garment.

By having both the tenter frame and the mold sections each moveable, it is possible to obtain a better tension on the fabric prior to heat molding of the fabric.

As a result of the present method, the garment can be manufactured in an automated process with minimal amount of labor. All of the operations can be automated and mass produced without any labor intensive requirements. Furthermore, designers can now have an opportunity to expand their design abilities since they are no longer limited to two dimensional fabrics but can produce three dimensional effects using either the molding, bonding, or the combination of both techniques.

There has been disclosed heretofore the best embodiment of the invention presently contemplated. However, it is to be understood that various changes and modifications may be made thereto without departing from the spirit of the invention.

DISCLOSURE DOCUMENT PROGRAM

A brief description of the above invention has been submitted as part of the "Disclosure Document Program" and has been assigned Disclosure Document #132372. The document was dated Nov. 7, 1984.

What I claim is:

1. A method of manufacturing a garment, comprising the steps of:
    (a) feeding opposing sections of flat uncut thermosetting fabric material, in full, from bolts of such fabric material, to a heat molding section;
    (b) positioning the opposing sections of said flat uncut thermosettiong fabric material, in full, on either side of a male mold of the garment shape to be formed;
    (c) closing a pair of female mold sections onto the male mold to sandwich the fabric in the mold cavity formed between the male mold and the female mold section;
    (d) heat molding the opposing sections to form a three dimensional garment shape including heat molded three dimensional body contours; and
    (e) simultaneously with the heat molding, ultrasonically bonding and cutting about the periphery of the female sections to form the desired garment.

2. A method as in claim 1, and further comprising the step of opening the mold cavity and removing the garment.

3. A method as in claim 1, wherein only one unitary section of fabric is utilized for forming the front of the garment and another unitary section of fabric is utilized for forming the back of the garment.

4. A method as in claim 1, and further comprising removing parts of the mold after completing the garment to facilitate removal of the garment.

5. A method as in claim 2, and further comprising retracting parts of the male mold after completing the garment to facilitate removal of the garment.

6. A method as in claim 2, and further comprising the step of allowing the garment to cool after the cavity is opened and prior to removal of the garment.

7. A method as in claim 1, and further comprising the step of indexing the opposing sections of fabric material on a pin frame as it is fed along a conveyer system.

8. A method as in claim 2, and wherein said removal of the garment comprises the steps of pinching the garment using a robotic lifter and lifting the garment off the mold.

9. A method as in claim 1, and further comprising heat molding a three dimensional ornamental design into the garment.

10. A method as in claim 9, wherein the three dimensional contour and the three dimensional ornamental design are simultaneously molded into the garment.

11. A method as in claim 1, and further comprising ultrasonically forming designs into the garment simultaneously with the bonding.

* * * * *